United States Patent [19]

Kogane et al.

[11] Patent Number: 4,922,289

[45] Date of Patent: May 1, 1990

[54] PHOTOGRAPHIC FILM CARRIER

[75] Inventors: Mikio Kogane; Tsutomu Kimura, both of Tokyo, Japan

[73] Assignee: Fuji Photo Film Co., Ltd., Kanagawa, Japan

[21] Appl. No.: 331,992

[22] Filed: Apr. 3, 1989

[30] Foreign Application Priority Data

Apr. 1, 1988 [JP] Japan .................................. 63-80336

[51] Int. Cl.⁵ ............................................. G03B 29/00
[52] U.S. Cl. ........................................ 355/29; 355/41; 355/72; 355/75
[58] Field of Search ......................... 355/29, 41, 72, 75

[56] References Cited

U.S. PATENT DOCUMENTS

| | | | |
|---|---|---|---|
| 3,718,807 | 2/1973 | Bracken et al. | 355/29 |
| 4,176,944 | 12/1979 | Payrhammer | 355/29 |
| 4,837,601 | 6/1989 | Nakane et al. | 355/29 |

Primary Examiner—Monroe H. Hayes
Attorney, Agent, or Firm—Sughrue, Mion, Zinn, Macpeak & Seas

[57] ABSTRACT

A photographic film carrier holds a photographic film firm and flat to place picture frames of the photographic film at a position of a photographic apparatus where each picture frame is projected for exposure or inspection. The film carrier is formed with a framing mask opening for holding a picture frame of the photographic film firm and flat in the framing mask opening and is provided with motor driven film transporting rollers for transporting the photographic film. A marking device is disposed downstream of the framing mask opening for forming, in one side margin of the photographic film, a perforation as a cut-mark along which the photographic film is to be cut transversely. A detector is mounted on the film carrier for detecting a transported length of the photographic film including a predetermined number of picture frames. The marking device is actuated by a controller to form a cut-mark when the detector detects a predetermined length of the photographic film.

8 Claims, 2 Drawing Sheets

PHOTOGRAPHIC FILM CARRIER

BACKGROUND OF THE INVENTION

The present invention relates to a negative film carrier used in a photographic printer, and more particularly to a negative film carrier which can apply marks on a negative film at which the negative film is cut to film strips including a predetermined or selected number of picture frames.

In large scale photofinishing laboratories, developed photographic films are cut into film strips including a predetermined or selected number of picture frames. The film strips are put in open-ended elongated film cover or holder envelopes for protection and storage. Such laboratories are equipped with an automatic apparatus for putting negative strips in film holder envelopes. One example of an automatic apparatus, disclosed in Japanese Unexamined Utility Model Publication No. 49-130,915, includes a guide member for opening one end of an elongated envelope of the film holder, a film cutter for cutting the negative film into strips each including a predetermined or preselected number of picture frames and feed rollers for putting each negative strip in the open-ended film holder envelope.

To complete making prints from a negative film, cutting the negative film into negative strips and putting the negative strips in film holder envelopes, all in one stage, photographic printers have been developed with an automatic apparatus for putting the negative strips into the film holder envelopes. One example of such a photographic printer is disclosed in Japanese Unexamined Patent Publication No. 55-27,100.

In the conventional apparatus described above for putting negative strips in film holder envelopes, notches formed in one side margin of a negative film should be counted to detect a predetermined number of picture frames. However, in so-called mini-laboratory printing systems, used in relatively small photofinishing laboratories negative films are not formed with notches upon printing. Therefore the conventional automatic apparatus for putting negative strips in film holder envelopes cannot be used in cooperation with such mini-laboratory printing systems.

Furthermore, since picture frames of a negative film not required to be printed are usually not provided with notches, a negative film having at least one picture frame without a notch cannot be measured to detect or count picture frames based on notches formed in one side margin of the negative film.

SUMMARY OF THE INVENTION

Therefore, it is a primary object of the present invention to provide a photographic film carrier which can form cut-marks in a negative film so as to make it possible to cut the negative film into negative strips each having a predetermined number of picture frames.

The above and other objects of the present invention are achieved by a film carrier which places picture frames of a photographic film at a predetermined position of a photographic apparatus where each picture frame is projected for printing or inspecting. The film carrier is formed with a framing mask opening for holding a picture frame of the photographic film firm and flat in the framing mask opening, and is provided with film transporting means, mounted on the film carrier, for transporting the photographic film held by the carrier; marking means, disposed downstream of the framing mask opening for applying, to one side margin of the photographic film, a cut-mark along which the photographic film is to be cut transversely to a film strip including a predetermined number of picture frames; detecting means, mounted on the film carrier, for detecting a transported length of the photographic film; and control means for actuating the marking means to apply a cut-mark when the detecting means detects a predetermined length of the photographic film.

According to a preferred embodiment of the present invention, the film transporting means includes a pulse controlled stepping motor. The detecting means counts drive pulses applied to the stepping motor to detect a predetermined length of the photographic film including a predetermined number of picture frames.

When a cut-mark sensor disposed after the marking means detects a cut-mark, cutter means disposed after the cut-mark sensor cuts off the photographic film along said cut-mark into a film strip which includes the predetermined number of picture frames. The film strip is further transported out of the film carrier means so as to be automatically put in a film holder envelope disposed adjacent to the downstream end of the film carrier means.

Cut-marks can take any desirable form, such as a perforation, a notch, an ink printed mark, etc. While such cut-marks are desirably formed between adjacent picture frames, nevertheless, they may be at any position on a side margin of the photographic film.

BRIEF DESCRIPTION OF THE DRAWINGS

One presently preferred embodiment of the present invention now will be described in detail with reference to the accompanying drawings, in which.

DETAILED DESCRIPTION OF THE PREFERRED EMBODIMENT

Figure 1:
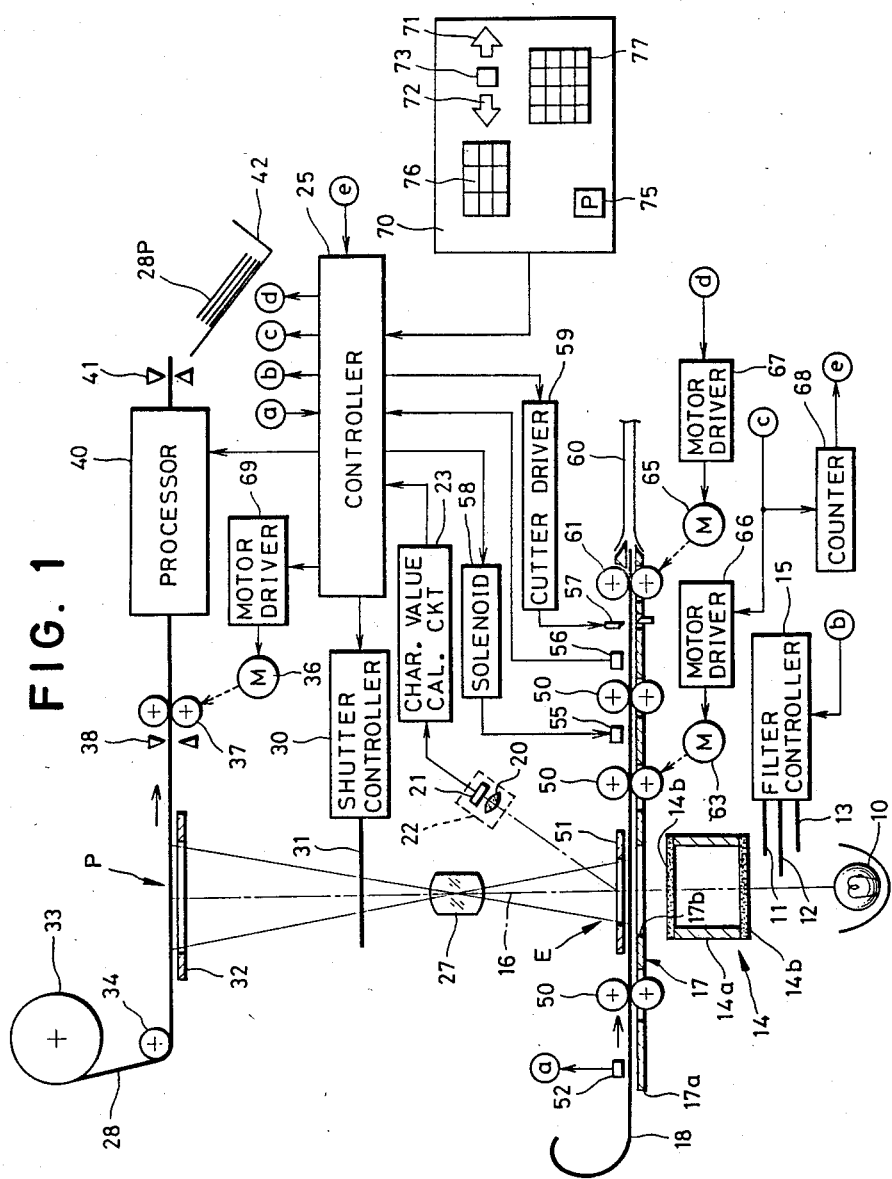
FIG. 1 is a schematic block diagram showing a photographic printer in use with a photographic film carrier according to a preferred embodiment of the present invention.

Referring now to FIG. 1, a photographic printer using a film carrier according to the present invention is shown, including three complementary color filters 11, 12, 13, namely cyan, magenta and yellow. Each color filter 11, 12 or 13 is controllably insertable, independent of the other two, into a printing path 16 between an illumination lamp 10 and a mirror box 14 which comprises a square hollow tube 14a having inner mirrored walls and top and bottom diffusion plates 14b. The white light from the lamp 10 passes through the color filter 11, 12 or 13 into the mirror box 14 and is diffused thereby.

After passing through a color original or color negative film 18 placed between a negative film carrier 17 and a framing mask 51 so as to be placed flat in a exposure station E, the diffused light is focused on a color photographic paper 28 by means of a printing lens 27 to create a latent image of the negative film 18 under the control of a shutter 31 which is controlled by a shutter controller 30 to open for a certain amount of time. After exposure, a length of the color photographic paper 28 equal to one frame is withdrawn from a roll paper supply 33 by withdrawing rollers 37 which is actuated by an electric pulse motor 36 to place an unexposed part thereof in a printing station P defined by a framing mask 32. After the framing mask 34, there is a cutter 38 for cutting the exposed part of the color photographic paper 28 to a strip including a predetermined number of exposed frames, for example six frames, which, in turn, is sent to a photographic processing section 40 which is well known in the art and which is shown in block. The processed photographic paper 28 is cut by a cutter 41 into individual prints 28P which, in turn, are delivered into a tray 42.

Figure 2:
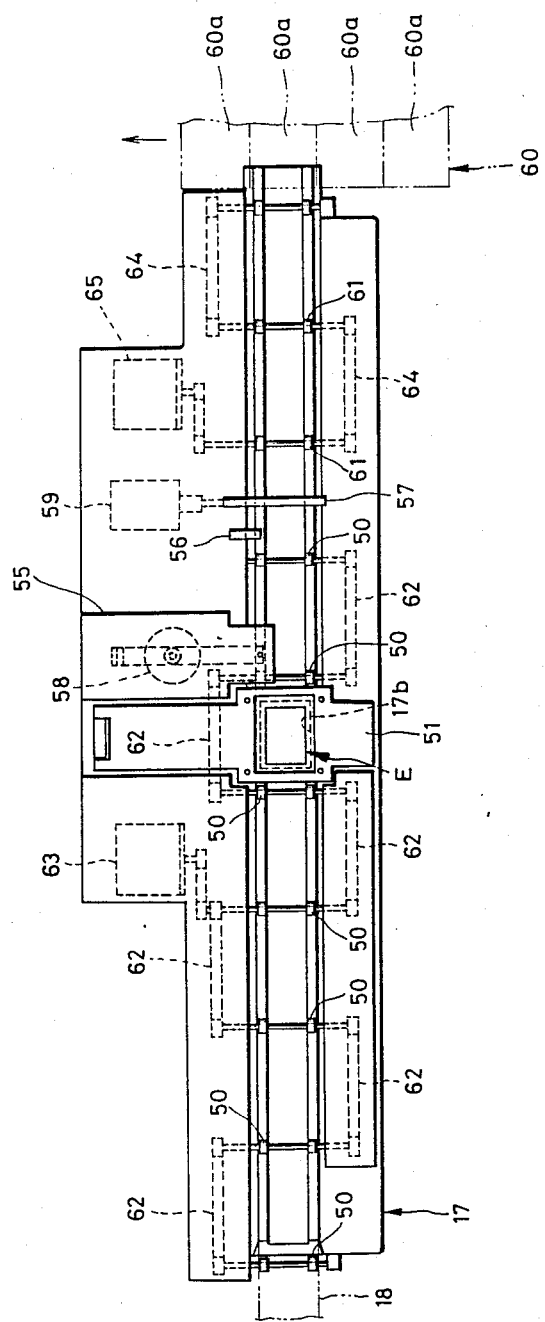
FIG. 2 is a plan view showing the photographic film carrier shown in FIG. 1.

The negative film 18 is transported in a direction from the left to the right as viewed in FIG. 1 by means of two sets of motor driven rollers 50 and 61 disposed on one side of the exposure station E. As shown in detail in FIG. 2, the negative film carrier 17 has a carrier plate 17a and has an exposure opening 17b formed therein. On both sides of the carrier plate 17a, there are provided seven sets of drive rollers 50 and three sets of drive rollers 61 which are arranged at substantially regular spacings along the lengthwise direction of the negative film carrier 17. The seven sets of drive rollers 50 are operationally coupled with belts 62. Similarly, the three sets of drive rollers 61 are operationally coupled with belts 64. The drive rollers 50 are driven with a pulse motor 63 under the control of motor driver 66. Similarly, the drive rollers 61 are driven with a pulse motor 59 under control of motor driver 67.

The pulse motor 63 is used to forward the negative film 18 intermittently so as to place picture frames at the exposure station one at a time. The pulse motor 65 is used to forward continuously a negative strip cut off from the negative film 18 so as to put the strip into a film holder envelope. The negative film carrier 17 is further provided with a cut-mark former or perforator 59 and a solenoid 58 for actuating the perforator, as will be described later. The negative film carrier 17 is further provided with a cutter 57 which is actuated under the control of a cutter driver 59.

Located away from the exposure position E, there is an image scanner 22 comprising a lens 20 and an image area sensor 21 to detect the light passed through a great number of points of the negative film 18 placed in the exposure station E. Outputs from the image scanner 22 are set to a characteristic value calculation section 23 in order to obtain characteristic values such as a large area transmittance density, a maximum density and a minimum density for each color, these values in turn being transmitted to a controller 25.

Between the rollers 50 and 61, there are a perforator 55 which forms cut-marks, such as small holes or notches, in one side margin of the negative film 18 and a cut mark sensor 56 for detecting the cut-marks formed by the perforator 55, in order from the rollers 50. On the other side of the exposure station E opposite to the rollers 50, there is an edge sensor 52 for detecting the leading edge of the negative film 18. Between the rollers 61 and the perforator 55, there is a cutter 57 to cut off a part of the negative film 18 when six picture frames of the negative film 18 are exposed after the detection of a cut-mark by the cut-mark sensor 52. The output signals from the edge sensor 52 and the cut-mark sensor 56 are sent to a controller 25.

The controller 25 comprises a microcomputer and determines an exposure level based on the characteristic values and correction values as well as controlling the filter controller 15 and the shutter controller 30. The controller 25 has a counter 68 for counting drive pulses applied to the pulse motor 63 so as to detect a transported distance of the negative film 18. The controller 25 causes the perforator 55 to form a notch as a cut-mark in a side margin of the negative film 18 between adjacent picture frames every six picture frames upon detecting an end of a picture frame with the scanner 22. The controller 25 also controls the rotation of the pulse motor 65 for the drive rollers 61 based on outputs from the cut-mark sensor 57 and the cutter driver 59 to operate the cutter 57 so as to cut the negative film 18 into negative strips every six picture frames. Each negative strip is inserted into a film holder envelope 60a. As shown, a large number of film holder envelopes 60a are joined side by side in the form of a single roll 60. Cutting the negative film 18 is preferably performed when it is inserted in the film holder envelope 60a to some extent.

A keyboard 70 connected to the controller 25 has various keys, such as positioning means comprising backward and forward movement keys 71 and 72 for making a fine adjustment of position of the negative film 18, a pass key 73 for advancing the negative film 18 by one frame, a print key 75 for initiating a print process, correction keys 76 for entering data for density and color correction, and alphabetical and numerical keys 77.

Before starting the printing of a negative film 18, the negative film carrier with the negative film 18 placed therein is put in the exposure station E in such a way that the leading end is caught between the rollers 50 and 53 in a well known manner. Pushing the pass key 73 causes the controller to generate a forward signal and a predetermined number of drive pulses for the driver 66 so as to rotate the pulse motor 63 in a normal direction, forwarding the negative film from the left to the right as viewed in FIG. 1, by one pitch which is defined by the distance between the center lines of two adjacent picture frames. The forward signal also is sent to the counter 68 to change it to a count-up state which causes it to count up the drive pulses, to determine the distance by which the negative film 18 is advanced. The counter 68 is reset to its initial state when the controller 25 receives an edge signal from the edge sensor 52 or when the controller 25 outputs an actuation signals for the perforator 55.

After the predetermined distance of forward movement of the negative film 18, the pulse motor 63 stops. Then, a visual observation is made to inspect the picture frame in the exposure station E. If the picture frame is incorrectly positioned, either the forward movement key 71 of the backward movement key 72 is operated slowly to rotate the pulse motor 63 in one direction so as to move the negative film 18 slightly in a corresponding direction for position adjustment. When the forward movement key 71 is operated the counter 68 is changed to the count-up state to count up drive pulses applied to the pulse motor 63 for the position adjustment. Similarly, when the backward movement key 72 is operated the counter 68 is changed to the count-down state to count down drive pulses applied to the pulse motor 63 for the position adjustment.

Once the picture frame has been adjusted properly into position in the exposure station E, it is inspected to determine whether the picture frame of the negative film 18 is suitable to be printed. If the picture frame has no image, a fuzzy image or an improperly exposed image such as, an extremely over exposed or under exposed image, the picture frame should not be printed. In this case, the pass key 73 is operated to advance the negative film 18 by one frame, so as to place the next picture frame in the exposure station E in the same way as described for the previous picture frame. Otherwise, if the picture frame can be printed, then it is visually inspected to determine whether automatic exposure control would be expected to produce subject failure in a print. If in fact subject failure is expected and a print of the picture frame will not be finished properly in density and/or color, then the necessary data, such as density and/or color correction for a proper printing condition, are entered through the correction keys 76 to perform manual exposure control. The correction data is temporarily stored in a memory of the controller 25 and is read out during the print process to calculate a proper exposure for the picture frame.

When the print key 75 is operated to initiate the print process, after the visual inspection of the picture frame, the controller 25 actuates the image scanner 22 to measure the transmitted light through the respective points of the picture frame of the negative film 18 for three colors, namely red, green and blue. The measured values for the three colors are transformed into density signals to extract characteristic values such as a large area transmittance density, a maximum density, a minimum density and a density of a specified point for each color in the characteristic value calculation section 23. These values then are sent to the controller 25.

The controller 25 calculates exposures by the use of the characteristic values and the exposure correction data read out from the memory of the controller 25 for each color. According to the exposure thus calculated, the filter controller 15 controls each color filter 11, 12, 13 to move into the printing path 16 one by one. When each color filter 11, 12, 13 is inserted into the printing path 16, the illumination lamp 10 is excited to emit light to its full intensity for a certain period of time. During the excitation of the illumination lamp 10, the shutter controller 30 opens the shutter 31 to expose the photographic paper 28 to the projected picture frame of the negative film 18.

The above described visual inspection and exposure is effected repeatedly for each picture frame of the negative film 18. When the controller 25 detects the forward movement of the negative film 18 by a distance equal to six picture frames, the controller 25 causes the perforator 55 to form a notch as a cut mark in one side margin of the negative film 18 at a distance equivalent to six frames from the position of the negative film 18 where the last notch has been formed. The counting of the six picture frames can be performed by counting the number of pulses applied to the pulse motor 63 for the drive rollers 50. Otherwise, it is preferred to count perforations of the negative film by the use of a photodetector as is well known in the art. It also may be effective to count the operating of the print start key 75 or to detect the edge of a picture frame by the use of an image sensor 21. To avoid count error, it is preferred to detect the distance and the number of picture frames by using any combination of these ways.

Because the negative film 18 usually has its first two or three frames unexposed, it is difficult to apply accurately a first cut-mark based on the count of picture frames. Such a difficulty can be avoided by forming a notch in one side margin of the negative film 18 between adjacent frames located at a distance from the leading edge of the negative film by a certain length shorter than the distance at which a notch normally is formed when the counter counts the first six picture frames. This is carried out only when the first notch is formed.

After the cut-mark sensor 56 detects a cut-mark, the controller 25 stops the pulse motor 65 when the negative film is forwarded so as to position the detected cut-mark at the position where the cutter 57 is located. Then, the controller 25 causes the cutter 57 to cut off the negative film 18 at the cut-mark, providing a negative strip including six frames. This negative strip is forwarded by the drive rollers 61 to enter into one of the envelopes 60a which is in alignment with the negative film path. After the first negative strip is put in the film holder envelope 60a, the film holder envelope 60a is moved upward to align an adjoining film holder envelope 60a with the negative film path. Once all negative strips cut off from a single negative film 18 are put into the film holder envelopes 60a, the film envelopes 60a are separated as one integral whole from the roll of film holder envelopes 60.

The exposed part of the photographic paper 28, after printing a predetermined number of frames, is cut off with the cutter 38 and then is developed in the processing section 40. Thereafter, the developed photographic paper is cut into individual prints 28P with the cutter 41, and the prints 28P are delivered into the tray 42.

To simplify the structure of the negative film holder 17, the cutter 57 and/or the drive rollers 61 can be provided separately from the negative film holder 17.

Cut-marks can take any desirable form such as a perforation, a notch, an ink printed mark, etc. While in the above described embodiment, such cut-marks are formed between adjacent picture frames, nevertheless they may be formed at any position on a side margin of the photographic film.

As apparent from the above description, the photographic film carrier of the present invention makes it possible for any photographic printer, film inspector or the like to form cut-marks in photographic negative films along with the photographic films are to be cut into short strips.

Although the present invention has been fully described by way of the preferred embodiments thereof with reference to the accompanying drawings, various modifications within the spirit and scope of the invention will be apparent to those of working skill in this technological field. Thus, it is intended that the invention not be limited to any of the details of this description, unless otherwise specified, but rather be construed broadly within its spirit and scope as set out in the accompanying claims.

What is claimed is:

1. A film carrier used in a photographic apparatus for placing picture frames of a photographic film at a predetermined position of the photographic apparatus where each picture frame is projected, said film carrier comprising:

film carrier means, having a framing mask opening, for holding a picture frame of said photographic film firm and flat in said framing mask opening;

film transporting means, mounted on said film carrier means, for transporting said photographic film held by said carrier means;

marking means, disposed downstream of said framing mask opening, for applying a cut-mark to one side margin of said photographic film, said photographic film being cut transversely at said cut-mark;

detecting means, mounted on said film carrier, for detecting a transported length of said photographic film; and control means for actuating said marking means to apply a cut-mark when said detecting means detects a predetermined length of said photographic film.

2. A film carrier as defined in claim 1, wherein said film transporting means includes a pulse controlled stepping motor, said control means transmitting drive pulses to said stepping motor to drive said stepping motor.

3. A film carrier as defined in claim 2, wherein said detecting means includes a pulse counter for counting said drive pulses applied to said stepping motor to detect said transported length.

4. A film carrier as defined in claim 1, wherein said photographic film has notches disposed along at least one lengthwise side, said detecting means comprising photodetector means for detecting and counting said notches to detect said transported length.

5. A film carrier as defined in claim 1 wherein said marking means includes a perforator for forming a perforation as said cut-mark.

6. A film carrier as defined in claim 1 further comprising a sensor for detecting a leading end of said photographic film and generating a reference signal for causing said detecting means to detect a transported length of said photographic film.

7. A film carrier as defined in claim 1, further comprising a cut-mark sensor, disposed after said marking means, for detecting a cut-mark, and a cutter, disposed after said cut-mark sensor, for cutting said photographic film along said cut-mark into a film strip including a predetermined number of picture frames when said photographic film is transported by a predetermined length after the detection of said cut-mark by said cut-mark sensor.

8. A film carrier as defined in claim 7, further comprising film transporting means, mounted on said film carrier means, for transporting said film strip cut from said photographic film out of said film carrier means.

* * * * *